(12) United States Patent
Araki et al.

(10) Patent No.: US 8,905,192 B2
(45) Date of Patent: Dec. 9, 2014

(54) LUBRICATING-OIL COLLECTION GUIDE TOOL

(75) Inventors: Kenichi Araki, Hiroshima (JP); Tsutomu Tada, Hiroshima (JP)

(73) Assignees: Nifco Inc., Yokohama-shi, Kanagawa (JP); Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 13/989,244

(22) PCT Filed: Nov. 21, 2011

(86) PCT No.: PCT/JP2011/076831
§ 371 (c)(1),
(2), (4) Date: Jun. 10, 2013

(87) PCT Pub. No.: WO2012/070545
PCT Pub. Date: May 31, 2012

(65) Prior Publication Data
US 2013/0283955 A1    Oct. 31, 2013

(30) Foreign Application Priority Data

Nov. 26, 2010 (JP) ................................ 2010-263246

(51) Int. Cl.
*F16H 57/04* (2010.01)
(52) U.S. Cl.
CPC .......... *F16H 57/0423* (2013.01); *F16H 57/043* (2013.01); *F16H 57/0426* (2013.01); *F16H 57/0457* (2013.01)
USPC ...................................................... 184/6.12
(58) Field of Classification Search
CPC . F16H 57/04; F16H 57/0426; F16H 57/0423; F16H 57/043; F16H 57/0494; F16H 57/045

USPC ........................................... 74/467; 184/6.12
See application file for complete search history.

(56) References Cited

U.S. PATENT DOCUMENTS 3,785,458 A * 1/1974 Caldwell et al. ............. 184/6.12
4,231,266 A * 11/1980 Nishikawa et al. ............. 74/467
(Continued)

FOREIGN PATENT DOCUMENTS

JP    1984-136328 U    9/1984
JP    1984-186554 U    12/1984
(Continued)

OTHER PUBLICATIONS

PCT, "International Search Report for PCT/JP2011/076831", Dec. 27, 2011.

*Primary Examiner* — William A Rivera
*Assistant Examiner* — Michael Riegelman
(74) *Attorney, Agent, or Firm* — Manabu Kanesaka

(57) ABSTRACT

A lubricating-oil collection guide tool includes an oil-collection container; an oil funnel guiding lubricating oil into an oil passage at an axis end of a rotation axis; and an oil-passage member communicating the oil funnel and the oil-collection container. The oil-passage member includes a first passage member extending from the oil-collection container, and a second passage member extending from the oil funnel. While an insertion hole is formed in a lateral wall portion on one end side of the second passage member, one end portion of the first passage member is a cylindrical end portion. The cylindrical end portion is inserted into the insertion hole to move in and out in the axis line direction. The cylindrical end portion moves in a long axis direction relative to the insertion hole, and turns as a center of an axis line of the cylindrical end portion.

11 Claims, 7 Drawing Sheets

(56) References Cited

U.S. PATENT DOCUMENTS

| | | | |
|---|---|---|---|
| 4,480,493 A * | 11/1984 | Takahashi | 74/467 |
| 4,987,974 A * | 1/1991 | Crouch | 184/6.12 |
| 5,154,517 A * | 10/1992 | Hodge | 384/470 |
| 6,533,072 B2 * | 3/2003 | Hori | 184/6.25 |
| 7,022,039 B2 * | 4/2006 | Hasegawa et al. | 475/159 |
| 7,322,900 B2 * | 1/2008 | Ichioka et al. | 475/159 |
| 7,537,537 B2 * | 5/2009 | Smet et al. | 475/159 |
| 7,900,535 B2 * | 3/2011 | Usami et al. | 74/606 R |
| 2008/0128212 A1 * | 6/2008 | Utzat et al. | 184/11.4 |
| 2012/0145483 A1 * | 6/2012 | Araki | 184/6.12 |

FOREIGN PATENT DOCUMENTS

| | | |
|---|---|---|
| JP | 1985-123456 U | 8/1985 |
| JP | S61-92363 A | 5/1986 |
| JP | H07-12655 U | 3/1995 |
| JP | H07-18061 U | 3/1995 |
| JP | 2003-329113 A | 11/2003 |
| JP | 2004-52904 A | 2/2004 |

* cited by examiner

LUBRICATING-OIL COLLECTION GUIDE TOOL

RELATED APPLICATIONS

The present application is National Phase of International Application No. PCT/JP2011/076831 filed Nov. 21, 2011, which claims priority from Japanese Application No. 2010-263246, filed Nov. 26, 2010.

FIELD OF TECHNOLOGY

The present invention relates to a lubricating-oil collection guide tool collecting a lubricating oil inside a housing case housing a power transmission element which transmits a power, and leading a collected lubricating oil to an oil passage of a rotation axis inside the housing case.

BACKGROUND ART

Inside the housing case housing the power transmission element (a gear and the rotation axis) which transmits the power, there is formed a main oil passage in an inside from an axis end face thereof as the rotation axis, and also formed a branched oil passage extending outward in a radial direction from the main oil passage thereof, and opening to an outside from an outer circumferential face thereof. The lubricating oil flipped up by the gear inside the housing case thereof is collected, and the lubricating oil thereof is led to an opening side of the main oil passage of the rotation axis. Thereby, the lubricating oil led to the main oil passage is sent outward in the radial direction of the rotation axis from the branched oil passage, and the lubricating oil thereof is used for lubricating the gear again. Consequently, in order to realize such a lubricating-oil circulation structure, conventionally, there is disposed the lubricating-oil collection guide tool inside the housing case.

As for the lubricating-oil collection guide tool, as shown in Patent Document 1, there is proposed a lubricating-oil collection guide tool, wherein an oil-collection container disposed upward in a series of gear groups inside the housing case, and receiving an oil flipped up by the gears; a guide member disposed in an axis end of the rotation axis inside the housing case, and guiding the lubricating oil into the main oil passage of the rotation axis; and an oil-passage member communicating the guide member and the oil-collection container, and leading the lubricating oil collected in the oil-collection container to the guide member, are integrally molded using a resin material. When using the above tool, compared to a case of using the lubricating-oil collection guide tool wherein the oil-collection container, the guide member, and the like are respectively separate bodies (for example, Patent Document 2), the number of an assembly can be reduced so as to be capable of facilitating the assembly. Also, there is no need for forming the oil passage in the housing case so as to be capable of reducing a load for a process relative to the housing case.

PRIOR ART DOCUMENTS

Patent Documents

Patent Document 1: Japanese Utility Model Application Publication No. H07-18061
Patent Document 2: Japanese Utility Model Application Publication No. H07-12655

SUMMARY OF THE INVENTION

Problems to be Solved by the Invention

The aforementioned housing case tends to be comparatively large; therefore, accompanied by that, the lubricating-oil collection guide tool inevitably becomes large as well, and the lubricating-oil collection guide tool molded as an integral molded article by the resin material inevitably has a variability in a size thereof. Consequently, if, in a case where the lubricating-oil collection guide tool having the variability in the size is used for the assembly of the housing case, the lubricating-oil collection guide tool deforms by being twisted based on a property as a resin molded article, and the like. Accordingly, although the lubricating-oil collection guide tool can be assembled to the housing case, the assembly thereof may become deteriorated, or a posture of the lubricating-oil collection guide tool may become different from standards, so that there is a possibility that a performance of the lubricating-oil collection guide tool may decline.

The present invention is made in view of the aforementioned circumstances, and a technical object thereof is to provide a lubricating-oil collection guide tool which can accurately carry out the assembly relative to the housing case.

Means for Solving the Problems

In order to obtain the aforementioned technical object, the present invention is a lubricating-oil collection guide tool comprising a series of gears as a power transmission element; an oil-collection container disposed upward in the series of gears inside a housing case housing a rotation axis, and receiving an oil flipped up by a rotation of the gears; a guide member facing an axis end face of the rotation axis inside the housing case, and guiding a lubricating oil into an oil passage having an opening at the axis end face of the rotation axis; and an oil-passage member communicating the guide member and the oil-collection container, and leading the lubricating oil collected in the oil-collection container to the guide member. The oil-passage member includes a first passage member having one end and the other end, both being opened; and a second passage member having one end being closed, and the other end being opened. An insertion hole is formed in a lateral wall portion on one end side of the second passage member. One end portion of the first passage member is inserted and passed through the insertion hole to be capable of moving in and out, and one end opening of the first passage member is positioned inside the second passage member. Also, one end portion of the first passage member is in a loosely fitted state relative to the insertion hole. The other end opening of either one of the first or second passage member is communicated into the oil-collection container, and the other end opening of the other of the first or second passage member is communicated with the guide member. The oil-collection container and the guide member are configured to be capable of relatively being displaced and moving in an axis line direction and a radial direction of the rotation axis based on an in-and-out movement and a loosely fitting relationship of the first passage member relative to the insertion hole.

In the present invention, the insertion hole is a long hole extending in an extending direction of the second passage member; one end portion of the first passage member is a cylindrical end portion; and the cylindrical end portion can relatively turn relative to the long hole, and can slide in a long axis direction of the long hole. Accordingly, the oil-collection container and the guide member can ensure a displacement movement in the axis line direction of the rotation axis by the in-and-out movement of the cylindrical end portion relative to the insertion hole (inside the second passage member), and can ensure a displacement movement in the radial direction of the rotation axis by a relative turn of the cylindrical end portion relative to the long hole, and a slide in the long axis direction of the long hole. Accordingly, even in a case where the insertion hole is in a state of the long hole as a loose fitting hole, one end portion of the first passage member is the cylindrical end portion so as to be capable of accurately carrying out an assembly relative to the housing case.

In the present invention, on an outer circumference of an end portion of the cylindrical end portion, there is provided an enlarged diameter portion having a diameter expanded more than an outer diameter of the cylindrical end portion, as a retaining portion. The outer diameter of the enlarged diameter portion extends more than a length in a short axis direction of the long hole. Accordingly, even if the cylindrical end portion of the first passage member moves in a direction of falling out of the second passage member, a movement of the enlarged diameter portion accompanied by above is controlled by both lateral portions in the short axis direction of the long hole so as to prevent the cylindrical end portion of the first passage member from falling out of the second passage member, and to be capable of constantly maintaining the first and second passage members in a connected state.

In the present invention, a distance between the enlarged diameter portion and an inner end in an axis line direction of the cylindrical end portion is more than a thickness of the lateral wall portion on one end side of the second passage member. Accordingly, even in a case where the enlarged diameter portion is provided on the outer circumference of the end portion of the cylindrical end portion in the first passage member, and the first passage member is retained relative to the second passage member, an entering movement of the cylindrical end portion into the second passage member can be ensured so as to be capable of allowing the oil-collection container and the guide member to be displaced and move in the axis line direction of the rotation axis.

In the present invention, the second passage member is formed in a gutter shape having an upper part which is open, and in the lateral wall portion of the second passage member, in a portion wherein the long hole is present, an upside portion of the long hole is made thinner than a downside portion of the long hole, and the upside portion has a flexibility. Accordingly, even in the case where the enlarged diameter portion is provided on the outer circumference of the end portion of the cylindrical end portion, by bending the upside portion of the long hole, the cylindrical end portion including the enlarged diameter portion can be inserted in the long hole. Consequently, the first passage member can be easily connected relative to the second passage member.

In the present invention, the retaining portion is provided to protrude on the outer circumference of an end portion of one end portion of the first passage member in such a way as to face a peripheral edge portion of the insertion hole. Accordingly, even if the first passage member moves in the direction of falling out of the second passage member, a movement of the retaining portion accompanied by above is controlled by the peripheral edge portion of the insertion hole so as to prevent the first passage member from falling out of the second passage member, and to be capable of constantly maintaining the first and second passage members in the connected state.

In the present invention, a guide wall portion is provided on an end face of one end portion of the first passage member in such a way as to project from the end face. Inside the second passage member, the guide wall portion is disposed to control the lubricating oil flowing to one end side of the second passage member more than the first passage member, thereby accurately leading the lubricating oil to the guide member.

In the present invention, the opening of the other end of the first passage member is communicated into the oil-collection container, and the opening of the other end of the second passage member is communicated with the guide member. Accordingly, the lubricating oil from the oil-collection container can be accurately supplied into the second passage member by one end portion of the first passage member so as to be capable of realizing an appropriate lubricating-oil circulation structure.

Effect of the Invention

According to the present invention, even if a size of the lubricating-oil collection guide tool varies with respect to a prescribed size, and the lubricating-oil collection guide tool having the varied size is assembled to the housing case, the oil-collection container and the guide member can be relatively displaced and move in the axis line direction and the radial direction of the rotation axis based on the in-and-out movement and the loosely fitting relationship of the first passage member relative to the insertion hole. Thereby, a deformation force based on a variety of size is absorbed, and the lubricating-oil collection guide tool is assembled to the housing case in a posture state in accordance with a standard. Consequently, a lubricating-oil collection guide tool being capable of accurately carrying out the assembly relative to the housing case can be provided.

BEST MODES OF CARRYING OUT THE INVENTION

Hereinafter, embodiments of the present invention will be explained with reference to drawings.

Figure 1:
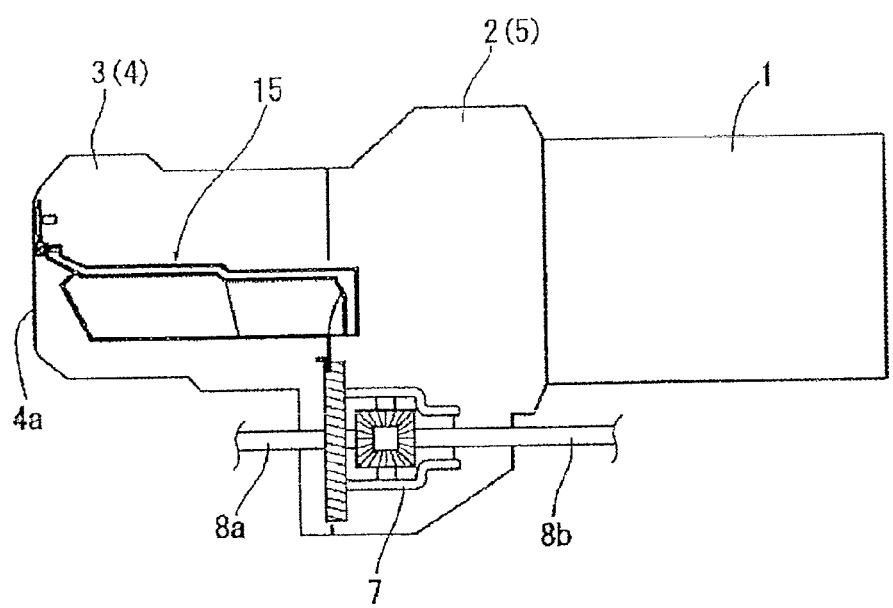
FIG. 1 is an explanatory drawing showing a transmission and the like wherein a lubricating-oil collection guide tool according to an embodiment of the present invention is used.
Figure 2:
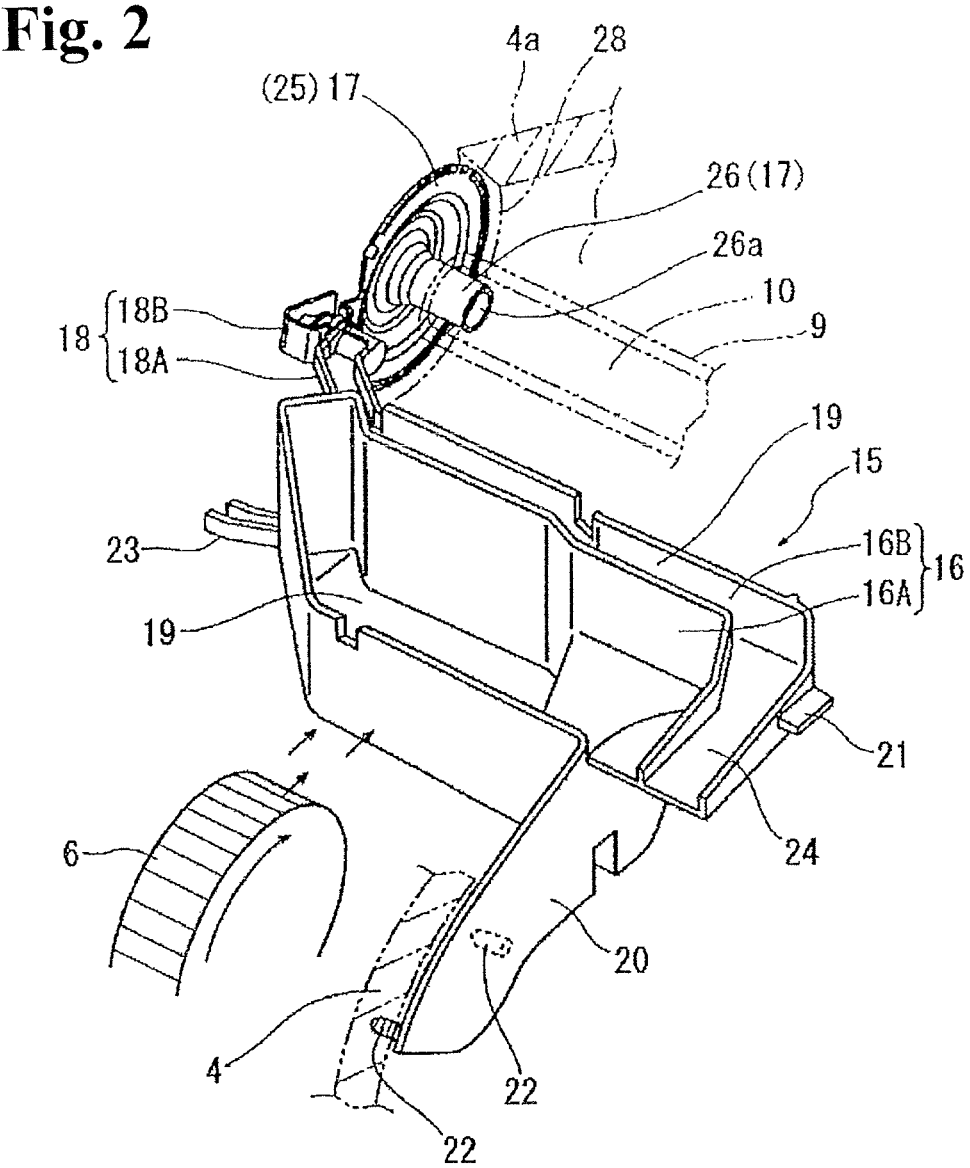
FIG. 2 is a perspective view showing the lubricating-oil collection guide tool according to the embodiment.
Figure 3:
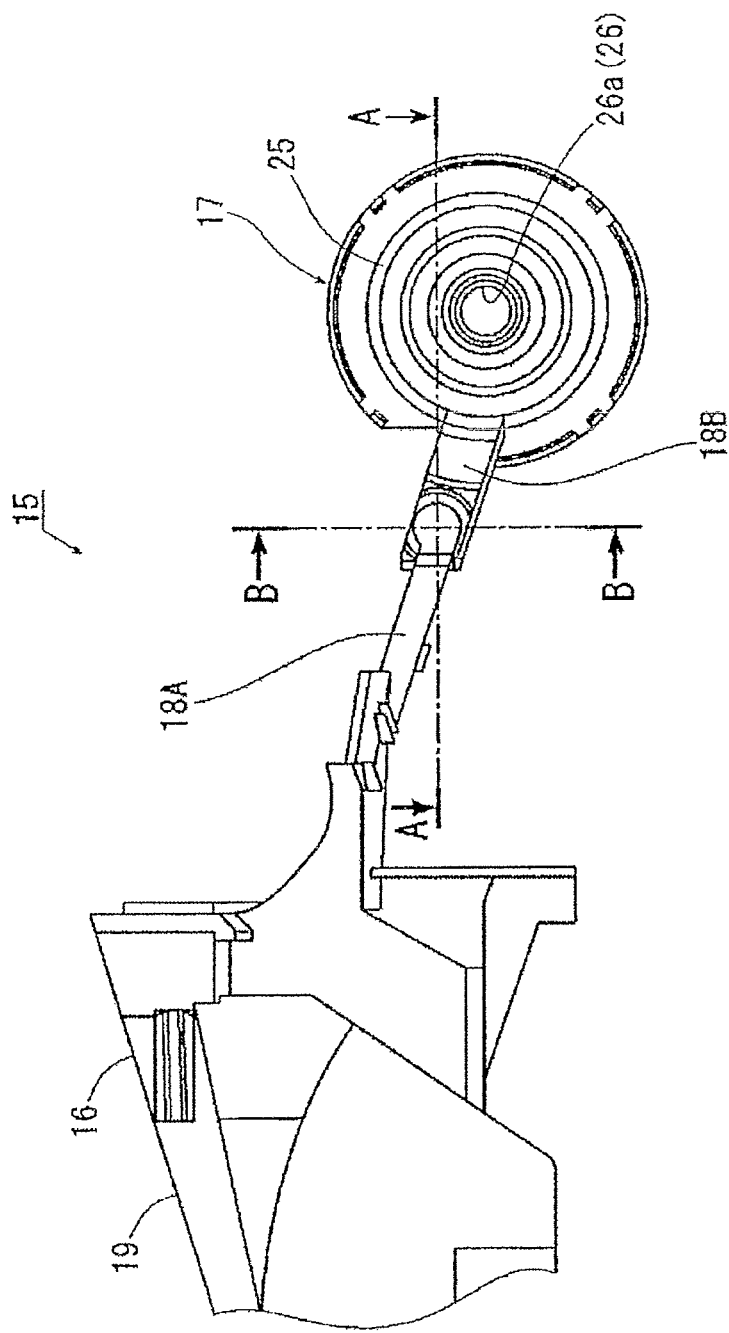
FIG. 3 is a front view showing the lubricating-oil collection guide tool according to the embodiment.
Figure 4:
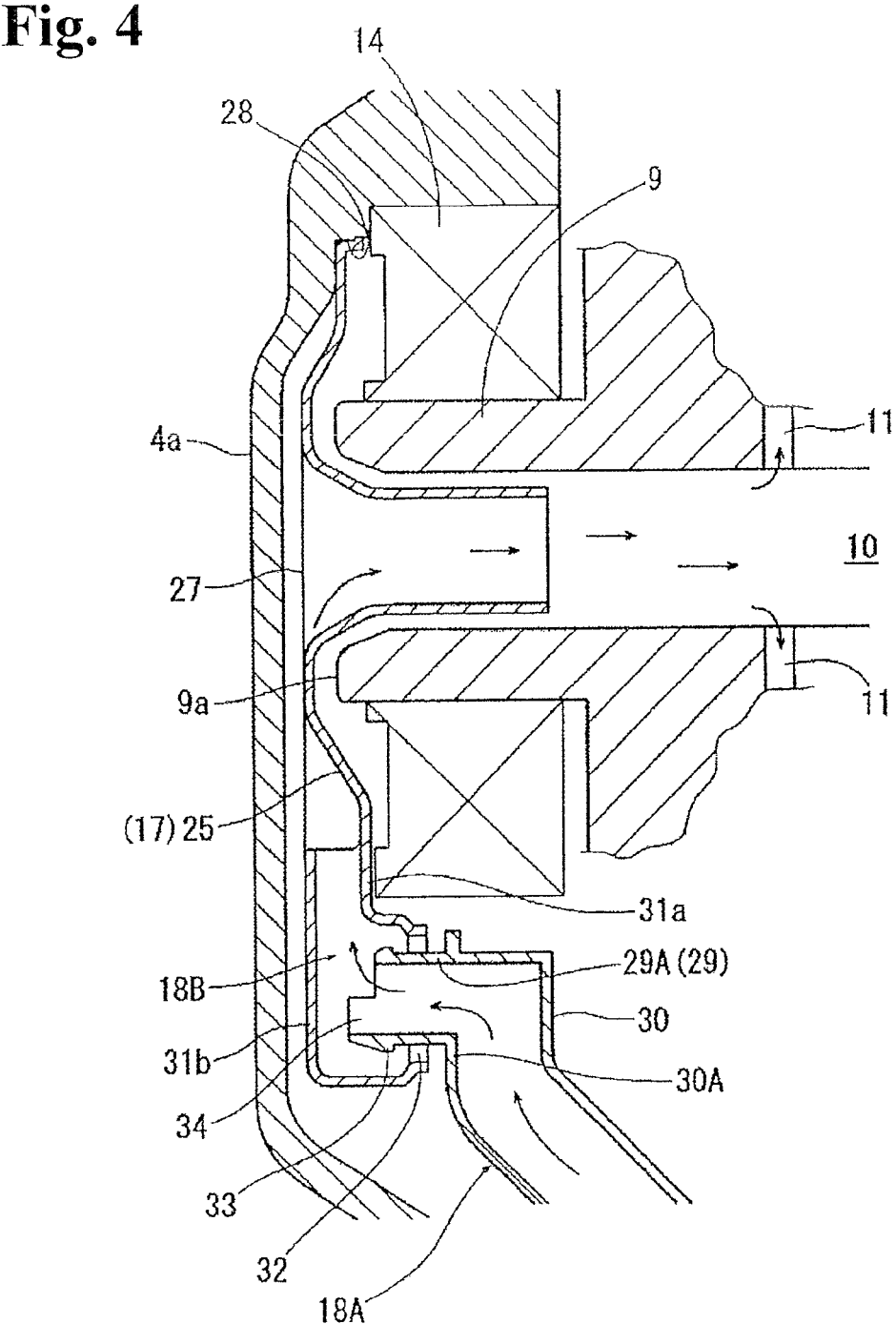
FIG. 4 is an explanatory drawing explaining an assembly state inside a mission case of an oil funnel according to the embodiment.

In FIG. 1, the reference numeral 1 represents an engine, the reference numeral 2 represents a clutch, and the reference numeral 3 represents a transmission. The transmission 3 comprises a mission case (a housing case) 4 having a bottom with a cylindrical shape, and an end face on an opening side thereof is jointed to a joint end face of a clutch case 5 of the clutch 2. Inside the mission case 4, there are housed a series of gear groups 6 (not shown in FIG. 1, and see FIG. 2), and a rotation axis 9 and the like (see FIG. 2) supporting the gear groups 6 thereof. By the series of gear groups 6, an output power on an engine side is adjusted, and the adjusted output power thereof is transmitted to right-and-left drive shafts 8a and 8b through a differential gear 7. As shown in FIG. 2 and FIG. 4, in the rotation axis 9, there are included a main oil passage 10 and a plurality of branched oil passages 11. In the rotation axis 9, as the case with the other rotation axis 9, an axis line direction thereof faces an axis line direction (in FIG. 1, a right-and-left direction) of the mission case. The main oil passage 10 of the rotation axis 9 thereof extends inward in the axis line direction thereof from an axis end face 9a thereof. Each branched oil passage 11 extends outward in a radial direction from the main oil passage 10, and is open to an outside from an outer circumferential face of the rotation axis 9. Incidentally, in FIG. 4, the reference numeral 14 represents a bearing which rotatably supports an end portion of the rotation axis 9.

As shown in FIG. 1 and FIG. 2, inside the mission case 4, there is disposed a lubricating-oil collection guide tool 15 made of a resin (for example, 6-6 nylon). The lubricating-oil collection guide tool 15 comprises an oil-collection container 16, an oil funnel 17 as a guide member, and an oil-passage member 18 communicating the oil-collection container 16 and the oil funnel 17.

As shown in FIG. 2, the oil-collection container 16 has a longish box shape, and an upper portion thereof is open with an upper-portion opening 19 having a comparatively wide area. The oil-collection container 16 is disposed upward in the series of gear groups 6 inside the mission case 4 while facing a longitudinal direction (in FIG. 1, the right-and-left direction) thereof in the axis line direction of the mission case 4. The upper-portion opening 19 receives a lubricating oil (shown by arrows in FIG. 2) flipped up by a rotation of the series of gear groups 6 as much as possible. In the present embodiment, the oil-collection container 16 includes a first-collection container portion 16A and a second-collection container portion 16B in an abutted state. Each collection container portion 16A, 16B plays a role in supplying a collected lubricating oil to each predetermined portion.

As shown in FIG. 2, in one end portion in the longitudinal direction of the oil-collection container 16, there are integrally provided first and second support plate portions 20 and 21.

The first support plate portion 20 has a flat plate shape, and projects outward in one side (a downside in an up-and-down direction in FIG. 1) in a width direction of the oil-collection container 16 from a lateral face of the oil-collection container 16. A plate face of the first support plate portion faces the longitudinal direction of the oil-collection container 16. As shown in FIG. 2, in a front face (a face on the other end side in the longitudinal direction of the oil-collection container 16) of the first support plate portion 20, there is integrally provided a plurality of press-fit pin portions 22. The press-fit pin portions 22 protrude forward (the other end side in the longitudinal direction of the oil-collection container 16) from the front face of the first support plate portion 20. In the present embodiment, as for the press-fit pin portions 22, there is used one with a well-known brush clip shape. The press-fit pin portions 22 are pressed into press-fit holes (not shown in the figures) on the end face (a flange portion face or a boss face) on the opening side of the mission case 4 corresponding to the press-fit pin portions 22. A press fit thereof is carried out until the front face of the first support plate portion 20 abuts against the end face on the opening side of the mission case 4. Also, accompanied by a joint between the end face on the opening side of the mission case 4 and the joint end face of a clutch case 5, the first support plate portion 20 is housed inside a concave portion (not shown in the figures) formed in the clutch case 5. By a bottom face of the concave portion thereof, the first support plate portion 20 is controlled from moving to a back face side thereof (a side opposite to the press-fit pin portions 22). Incidentally, the press-fit pin portions 22, the press-fit holes, the first support plate portion 20, and the like are arbitrarily determined in consideration of a placement position, a shape, and the like of the oil-collection container 16.

The second support plate portion 21 protrudes outward in the longitudinal direction thereof from one end lateral face in the longitudinal direction of the oil-collection container 16 as a projecting piece of the flat plate shape. In the second support plate portion 21, a plate face thereof faces the up-and-down direction, and the second support plate portion 21 is held by a holding portion (not shown in the figures) of the clutch case 5.

On the other hand, as shown in FIG. 2, in the other end portion in the longitudinal direction of the oil-collection container 16, there is integrally provided a gutter-shaped passage member 23. The passage member 23 extends in such a way as to head downward as heading outward on the other end side in the longitudinal direction of the oil-collection container 16 from a lower portion of the first collection container portion 16A to lead the lubricating oil of the first collection container portion 16A to the predetermined portion. A lower end portion (an outflow end portion) of the passage member 23 thereof is supported in a support portion (not shown in the figures) inside the mission case 4. Naturally, the lubricating oil which has flowed out of the passage member 23 is supplied to a guide passage (not shown in the figures) formed in an inner wall of the mission case 4, and leading the lubricating oil to the predetermined portion.

Incidentally, in FIG. 2, the reference numeral 24 represents a passage member for leading the lubricating oil inside the second collection container portion 16B to one end side in the longitudinal direction of the oil-collection container 16.

As shown in FIG. 2 to FIG. 7, the oil funnel 17 integrally comprises a dish-shaped circular plate portion 25, and a cylinder portion 26 provided to protrude from a central part in a radial direction of an inner face of the circular plate portion 25 thereof. In the central part in the radial direction of the circular plate portion 25, an introduction opening 27 is opened, and through the introduction opening 27 thereof, an outer face side of the circular plate portion 25 and an inside of the cylinder portion 26 are communicated. The cylinder portion 26 allows the inside thereof to be communicated with the outside through an end opening thereof. An outer diameter of the cylinder portion thereof is reduced more than an inner diameter of the main oil passage throughout the whole cylinder portion. The oil funnel 17 is pressed into and held inside a concave portion 28 formed in a mission-case bottom portion 4a in a state wherein the cylinder portion 26 thereof faces inward in the axis line direction of the mission case. The concave portion 28 is deviated to an outside (an upper side in FIG. 1) in the width direction of the oil-collection container 16 thereof relative to the oil-collection container 16. Also, the concave portion 28 is positioned lower than a bottom portion of the first collection container portion 16A in the oil-collection container 16 thereof. However, in that position, the concave portion 28 faces the axis end face 9a of the rotation axis 9 including the main oil passage 10 and the like. Thereby, the cylinder portion 26 of the oil funnel 17 (the circular plate portion 25) pressed into and held in the concave portion 28 thereof is inserted into the main oil passage 10 of the rotation axis 9, and there is formed a gap between an outer circumference of the cylinder portion 26 of the oil funnel 17 and an inner circumference of the main oil passage 10. Consequently, regardless of the presence of the cylinder portion 26, the rotation axis 9 can rotate.

As shown in FIG. 2 to FIG. 7, the oil-passage member 18 includes a first passage member 18A and a second passage member 18B. In the present embodiment, both the passage members 18A and 18B are formed in a gutter shape having an upper end, which is open, and the first passage member 18A elongates more than the second passage member 18B.

In the first passage member 18A, both one end and the other end thereof are open. In the first passage member 18A, the other end thereof is integrally connected to a portion facing the mission-case bottom portion 4a within the second collection container portion 16B in the oil-collection container 16. The other end opening thereof is open near a bottom face inside the second collection container portion 16B. One end side of the first passage member 18A extends toward the oil funnel 17, and one end side thereof slopes downward as coming close to the oil funnel 17. Consequently, the lubricating oil inside the first collection container portion 16A flows toward one end side of the first passage member 18A by gravity. In the first passage member 18A, before reaching one end portion 29 thereof, the first passage member 18A is bent toward the width direction (the up-and-down direction in FIG. 1) of the oil-collection container 16, and there is formed a bent portion 30. Also, the bent portion 30 thereof is further bent outward in the longitudinal direction of the oil-collection container 16, and becomes one end portion 29. In the present embodiment, one end portion 29 of the first passage member 18A is a cylindrical end portion 29A, and the cylindrical end portion 29A thereof is connected to a lateral wall portion 30a in the gutter-shaped bent portion 30. An inside through-hole of the cylindrical end portion 29A thereof is communicated with an inside of the gutter-shaped bent portion 30. Incidentally, although an end face of the bent portion 30 is closed, in the present embodiment, the end face thereof is formed in an arc shape (see FIG. 5).

In the second passage member 18B, one end thereof is closed, and the other end thereof is open. The second passage member 18B extends toward an oil-collection container 16 side along the mission-case bottom portion 4a from the circular plate portion 25 of the oil funnel 17 with a shortish length. One lateral wall portion 31a in the other end thereof continues to a lateral portion of the circular plate portion 25, and the other lateral wall portion 31b in the other end thereof is disposed without being connected to any member on the outer face side of the circular plate portion 25 more than one lateral wall portion 31a. In that case, as for a width of a pair of lateral wall portions 31a and 31b, a side close to the circular plate portion 25 is narrowed more than a side far from the circular plate portion 25.

As shown in FIG. 4 to FIG. 8, in the lateral wall portion 31a of the second passage member 18B, there is formed an insertion hole 32 in one end side of the second passage member 18B thereof. In the present embodiment, the insertion hole 32 is formed in a long hole as a loose fitting hole, and a long axis direction thereof faces an extending direction of the second passage member 18B. A short axis length of the insertion hole 32 has substantially the same length as a diameter of the cylindrical end portion 29A of the first passage member 18A, and a long axis length of the insertion hole 32 is substantially elongated more than the diameter of the cylindrical end portion 29A. Also, in the lateral wall portion 31a, in a portion wherein the insertion hole 32 is present, an upside portion 31aa of the insertion hole 32 thereof is made thinner than a downside portion 31ab of the insertion hole 32, and the upside portion 31aa has a flexibility.

As shown in FIG. 4 to FIG. 7, in the insertion hole 32 of the second passage member 18B, there is inserted and passed through the cylindrical end portion 29A of the first passage member 18A to be capable of being displaced and moving in an axis line direction thereof. Consequently, an interval between a lateral wall portion 31a and a lateral wall portion 31b is set in view of ensuring a displacement movement thereof. Also, in that case, the cylindrical end portion 29A can relatively turn relative to the insertion hole 32, and also can slide in the long axis direction of the insertion hole 32. Thereby, the oil-collection container 16 and the oil funnel 17 can ensure a relative displacement movement in the axis line direction of the rotation axis 9 by an in-and-out movement of the cylindrical end portion 29A relative to the insertion hole 32 (inside the second passage member 18B). The cylindrical end portion 29A relatively turns relative to the insertion hole 32 (the long hole), and slides in the long axis direction of the insertion hole 32 so as to be capable of ensuring the relative displacement movement in the radial direction of the rotation axis 9.

As shown in FIG. 4 to FIG. 7, on an outer circumference of an end portion of the cylindrical end portion 29A, there is provided an enlarged diameter portion 33 as a retaining portion. The enlarged diameter portion 33 is formed around a whole circumference of the cylindrical end portion 29A, for example, as a bulge shape and the like. An outer diameter thereof elongates more than the short axis length of the insertion hole 32. The enlarged diameter portion 33 is disposed inside the second passage member 18B accompanied by an insertion of the cylindrical end portion 29A relative to the insertion hole 32. Thereby, even if the cylindrical end portion 29A of the first passage member 18A moves in a direction of falling out of the second passage member 18B, a movement of the enlarged diameter portion 33 accompanied by above is controlled by both lateral portions in a short axis direction of the insertion hole 32 so as to prevent the cylindrical end portion 29A of the first passage member 18A from falling out of the second passage member 18B. Namely, one end portion 29 of the first passage member 18A is connected relative to the second passage member 18B to be capable of being displaced and moving in the axis line direction thereof.

In that case, an interval between the enlarged diameter portion 33 and the lateral wall portion 30a of the bent portion facing the enlarged diameter portion 33 thereof, is substantially elongated more than a thickness of the lateral wall portion 31a of the second passage member 18B. Thereby, until a peripheral edge portion of the insertion hole 32 abuts against the lateral wall portion 30a of the bent portion 30, the cylindrical end portion 29A can enter into the second passage member 18B, and the cylindrical end portion 29A can be substantially displaced and move in an axis center direction thereof. Naturally, in that case, in consideration of that, the lateral wall portion 31b of the second passage member 18B is substantially separated from the lateral wall portion 31a.

Figure 5:
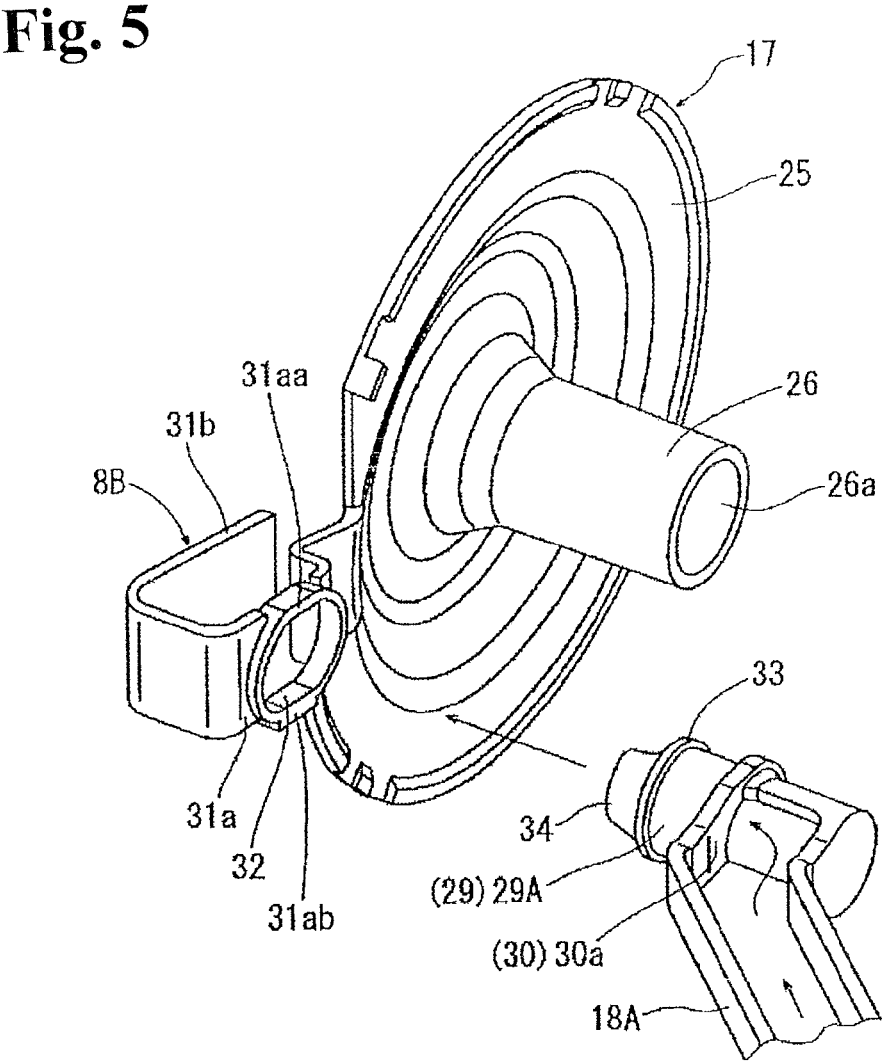
FIG. 5 is an explanatory drawing explaining a connection between a first passage member and a second passage member.
Figure 6:
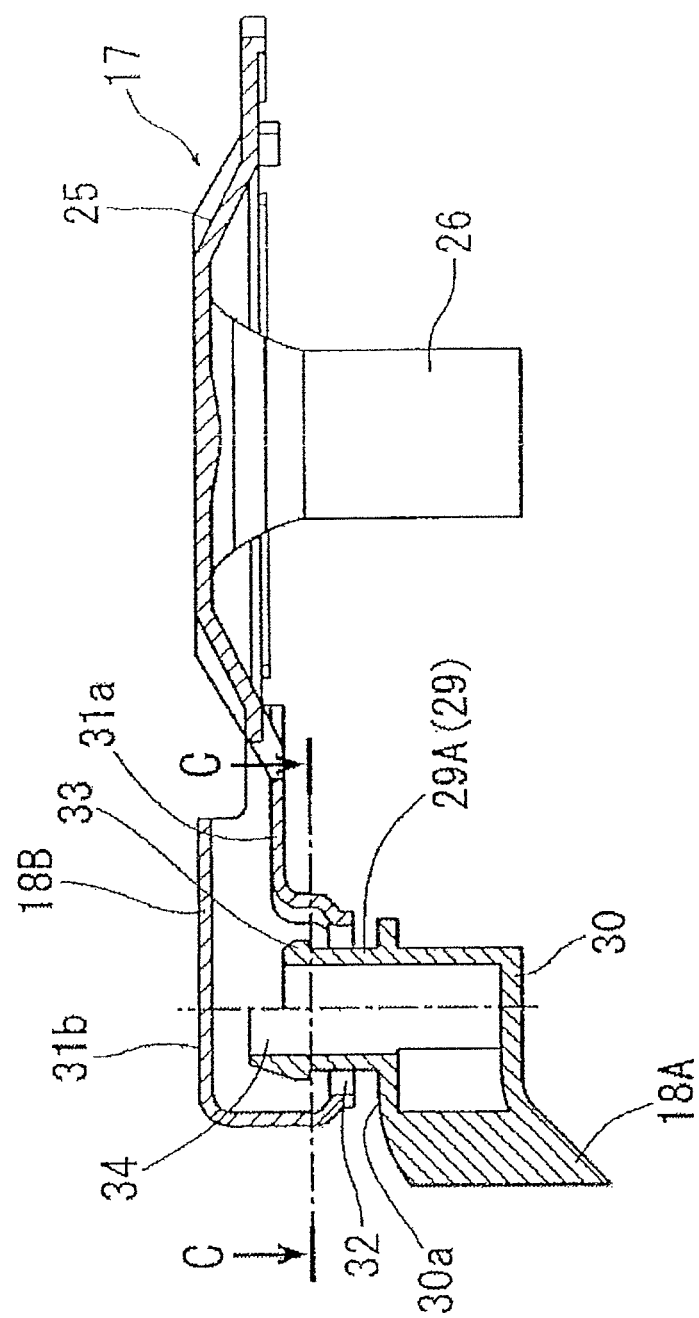
FIG. 6 is a cross-sectional view taken along a line A-A in FIG. 3.
Figure 7:
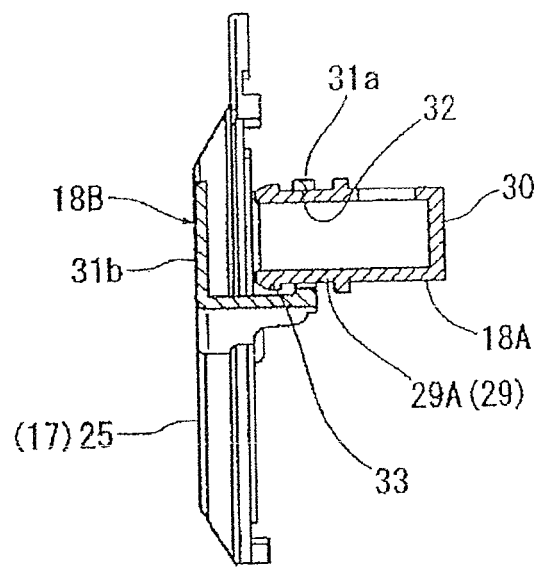
FIG. 7 is a cross-sectional view taken along a line B-B in FIG. 3.
Figure 8:
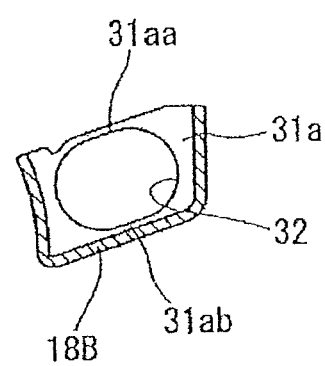
FIG. 8 is a cross-sectional view taken along a line C-C in FIG. 6.

As shown in FIG. 4 to FIG. 6, on a thickness end face of the cylindrical end portion 29A of the first passage member 18A, there is provided a guide wall portion 34 in such a way as to project from the end face. The guide wall portion 34 is disposed to control the lubricating oil from flowing to one end side of the second passage member 18B more than the first passage member 18A inside the second passage member 18B. Specifically, the guide wall portion 34 is formed along substantially a half circumference in one end side of the second passage member 18B as a standard of an axis line of the cylindrical end portion 29A. Naturally, even in a case where the guide wall portion 34 is provided in the cylindrical end portion 29A, a length between the pair of lateral wall portions 31a and 31b of the second passage member 18B is a length wherein the cylindrical end portion 29A can be displaced and move between the lateral wall portions 31a and 31b.

Such lubricating-oil collection guide tool 15 is assembled into the mission case 4 as follows.

At an assembly time, the inside of the mission case 4 is in a state before the series of gear groups 6 and the like are housed, and the oil funnel 17 of the lubricating-oil collection guide tool 15 is pressed into the concave portion 28 of the bottom portion 4a inside the mission case 4 thereof. Also, the press-fit pin portions 22 of the first support plate portion 20 in the oil-collection container 16 is pressed into the press-fit holes (not shown in the figures) on the end face (the flange portion face or the boss face) on the opening side of the mission case 4.

At that time, although the first and second passage members 18A and 18B are connected, the cylindrical end portion 29A of the first passage member 18A can be displaced and move in the axis line direction thereof relative to the insertion hole 32 (the long hole) of the second passage member 18B, so that the oil-collection container 16 and the oil funnel 17 can be displaced and move in the longitudinal direction (the axis line direction of the rotation axis 9) of the oil-collection container 16. Moreover, the cylindrical end portion 29A can be displaced and move in the long axis direction of the insertion hole 32 relative to the insertion hole 32 (the long hole) of the second passage member 18B. Also, the cylindrical end portion 29A can turn as a center of the axis line of the cylindrical end portion 29A, so that the oil-collection container 16 and the oil funnel 17 can be relatively displaced and move in the radial direction of the oil funnel 17 (the circular plate portion 25).

Consequently, accompanied by the fact that the lubricating-oil collection guide tool 15 enlarges, in the lubricating-oil collection guide tool 15 thereof, there occurs a variability in a size. Even if the lubricating-oil collection guide tool having the variability in the size thereof is assembled into the mission case (the circular plate portion 25 of the oil funnel 17 is pressed into the concave portion 28, and the press-fit pin portions 22 are pressed into the press-fit holes in the end face (the flange portion face or the boss face) on the opening side of the mission case 4, due to a connection relationship between the aforementioned first passage member 18A and second passage member 18B, a deformation force based on the variability in the size is absorbed, so that the oil-collection container 16 and the oil funnel 17 can not be deformed such as being relatively twisted and the like. As a result, the lubricating-oil collection guide tool 15 is assembled into the mission case in accordance with a standard.

On completion of the aforementioned assembly, the series of gear groups 6 and the like are housed into the mission case 4, and the joint with the clutch case 5 is carried out.

Thereby, the lubricating-oil collection guide tool 15 realizes a lubricating-oil circulation structure having a predetermined performance inside the mission case 4. Namely, the second collection container portion 16B (the oil-collection container 16) collects the lubricating oil flipped up by the series of gear groups, and the lubricating oil thereof is supplied to an outer face side of the oil funnel 17 through the first and second passage members 18A and 18B. The lubricating oil attached (supplied) to the outer face side of the oil funnel 17 thereof is drawn into the main oil passage 10 through the cylinder portion 26 thereof by a suction function based on a rotation of the rotation axis 9. The lubricating oil thereof is sent outward in the radial direction of the rotation axis 9 from the branched oil passage 11, and is used for lubricating the series of gear groups 6 again.

Although the embodiment has been explained above, the present invention includes the following aspects.

(1) The other end of the second passage member 18B is connected to the oil-collection container 16 (the second collection container portion 16B), and the other end of the first passage member 18A is connected to the oil funnel 17.

(2) The insertion hole 32 is totally in a loosely fitted state relative to the cylindrical end portion 29A.

(3) As long as the loosely fitted state with the insertion hole 32 can be ensured, one end portion of the first passage member 18A is not limited to the cylindrical shape.

(4) The first and second passage members 18A and 18B are not limited to the gutter shape, and a tube shape and the like are used.

All contents of the specification, claims, drawings, and abstract of Japanese Patent Application No. 2010-263246 filed on Nov. 26, 2010 are cited herein and are incorporated as a disclosure of the specification of the present invention.

What is claimed is:

1. A lubricating-oil collection guide tool, comprising:
a series of gears as a power transmission element;
an oil-collection container disposed above the series of gears inside a housing case housing a rotation axis, the oil-collection container receiving a lubricating oil flipped up by rotation of the series of gears;
a guide member facing an axis end of the rotation axis inside the housing case, the guide member guiding the lubricating oil into an oil passage having an opening at the axis end of the rotation axis; and
an oil-passage member connecting the guide member and the oil-collection container, the oil-passage member leading the lubricating oil collected in the oil-collection container to the guide member,
wherein the oil-passage member includes a first passage member having a first one end and a first another end, both being opened; and a second passage member having a second one end, and a second another end opened,
an insertion hole is formed in a lateral wall portion on a side of the second one end of the second passage member,
the first one end of the first passage member is inserted movably into the insertion hole, and one end opening of the first passage member is positioned inside the second passage member, and the first one end of the first passage member is movably fitted in the insertion hole,
the one end opening of the first passage member connects with the oil-collection container,
one end opening of the second passage member connects with the guide member,
the oil-collection container and the guide member move in an axis line direction of the rotation axis and a radial direction of the insertion hole,
the insertion hole extends in an extending direction of the second passage member,
the first one end of the first passage member is a cylindrical end portion, and
the cylindrical end portion turnably disposed in the insertion hole, and is movable in a long axis direction of the insertion hole.

2. A lubricating-oil collection guide tool according to claim 1, wherein an enlarged diameter portion having a diameter expanded more than an outer diameter of the cylindrical end portion, is provided on an outer circumference of an end portion of the cylindrical end portion as a retaining portion, and an outer diameter of the enlarged diameter portion elongates more than a length in a short axis direction of the insertion hole.

3. A lubricating-oil collection guide tool according to claim 2, wherein a distance between the enlarged diameter portion and an inner end in an axis line direction of the cylindrical end portion elongates more than a thickness of the lateral wall portion on the side of the second one end of the second passage member.

4. A lubricating-oil collection guide tool according to claim 2, wherein the opening of the first another end of the first passage member connects with the oil-collection container.

5. A lubricating-oil collection guide tool according to claim 2, wherein the second passage member is formed in a gutter shape having an upper part to be open, and in the lateral wall portion of the second passage member, in a portion wherein the insertion hole is present, an upside portion of the insertion hole is made thinner than a downside portion of the insertion hole, and the upside portion has a flexibility.

6. A lubricating-oil collection guide tool according to claim 5, wherein an opening of the first another end of the first passage member connects with the oil-collection container.

7. A lubricating-oil collection guide tool according to claim 1, wherein a guide wall portion is provided on an end face of the first another end of the first passage member in such a way as to project from the end face, and inside the second passage member, the guide wall portion is disposed to control the lubricating oil flowing to one end side of the second passage member more than the first passage member.

8. A lubricating-oil collection guide tool according to claim 7, wherein an opening of the first another end of the first passage member connects with the oil-collection container.

9. A lubricating-oil collection guide tool according to claim 1, wherein a retaining portion is provided to protrude on an outer circumference of an end portion of the first one end portion of the first passage member in such a way as to face a peripheral edge portion of the insertion hole.

10. A lubricating-oil collection guide tool according to claim 9, wherein an opening of the first another end of the first passage member connects with the oil-collection container.

11. A lubricating-oil collection guide tool according to claim 1, wherein an opening of the first another end of the first passage member connects with the oil-collection container.

* * * * *